United States Patent
Kirkland et al.

(10) Patent No.: US 10,988,237 B1
(45) Date of Patent: Apr. 27, 2021

(54) FEED FORWARD EQUALIZATION CONTROL FOR ACTIVE-ACTIVE REDUNDANT ACTUATION SYSTEMS

(71) Applicant: The Boeing Company, Chicago, IL (US)

(72) Inventors: Douglas B. Kirkland, Mukilteo, WA (US); Eyhab A. Saeed, Seattle, WA (US)

(73) Assignee: The Boeing Company, Chicago, IL (US)

( * ) Notice: Subject to any disclaimer, the term of this patent is extended or adjusted under 35 U.S.C. 154(b) by 1 day.

(21) Appl. No.: 16/717,492

(22) Filed: Dec. 17, 2019

(51) Int. Cl.
  *B64C 13/00*  (2006.01)
  *B64C 13/16*  (2006.01)
(52) U.S. Cl.
  CPC .................................... *B64C 13/16* (2013.01)
(58) Field of Classification Search
  CPC ......... B64C 13/16; B64C 13/02; B64C 17/00; B64C 19/00; B64C 19/02
  See application file for complete search history.

(56) References Cited

U.S. PATENT DOCUMENTS

| | | | |
|---|---|---|---|
| 4,800,798 A | 1/1989 | Boldrin | |
| 5,129,310 A | * 7/1992 | Ma .......................... | B64C 13/36 91/171 |
| 8,245,967 B2 | 8/2012 | Kirkland | |

* cited by examiner

*Primary Examiner* — Ian Jen
(74) *Attorney, Agent, or Firm* — Yee & Associates, P.C.

(57) ABSTRACT

A method and apparatus for controlling movement of a component in a system by a plurality of actuators. An operation actuation command to move the component is received. For each of the plurality of actuators, the operation actuation command is used to generate a feed-forward equalization command for the actuator, the feed-forward equalization command for the actuator is combined with the operation actuation command to provide an equalized actuation command for the actuator, and the actuator is controlled to move the component using the equalized actuation command for the actuator.

20 Claims, 11 Drawing Sheets

FEED FORWARD EQUALIZATION CONTROL FOR ACTIVE-ACTIVE REDUNDANT ACTUATION SYSTEMS

BACKGROUND INFORMATION

1. Field

The present disclosure relates generally to actuation systems, such as actuation systems for moving flight control surfaces on an aircraft. More particularly, the present disclosure relates to a system and method for controlling a plurality of actuators that are operated at the same time in an active-active redundant actuation system to move a flight control surface or other component.

2. Background

An actuator is a part of a system that is controlled to move another component of the system in a desired manner. Various different types of actuators are known and may be used in various different appropriate applications. Hydraulic actuators and electric motors are examples, without limitation, of different types of actuators.

The use of actuators to move flight control surfaces on an aircraft is an example of one application of actuators. Flight control surfaces are aerodynamic devices that allow an operator to adjust and control the flight of an aircraft. Ailerons, elevators, rudders, spoilers, flaps, slats, and air brakes are examples, without limitation, of flight control surfaces for aircraft.

In current aircraft, such as current commercial passenger aircraft, the movement of flight control surfaces on the aircraft is controlled by a flight control computer. The flight control computer generates commands for controlling the flight control surfaces that are designed to achieve a desired flight path, as defined by a human or automatic pilot. Typically, the commands generated by the flight control computer are transmitted electrically to actuator controller units that command actuator motion which in turn drives the associated flight control surface to a commanded position to achieve the desired flight path.

Aircraft flight control systems may be designed to enhance the reliability of aircraft during flight. For example, without limitation, aircraft reliability may be improved by the use of redundant systems in which a single flight control surface is associated with more than one actuator. In this case, if one of the actuators does not operate as desired, another one of the actuators may be used to move the associated flight control surface in the desired manner.

In an active redundant system, a backup actuator may automatically be used to move a flight control surface in response to undesired operation of another actuator associated with the flight control surface. In an active-active redundant system, multiple actuators may be used simultaneously to move a flight control surface. It is desirable that each of the multiple actuators in an active-active redundant system is controlled in an appropriate manner to operate simultaneously with the other actuators in the system to move a flight control surface in a desired manner in response to a command from the flight control computer. It desirable that each of the multiple actuators in an active-active redundant system responds to commands in very nearly the same manner.

Therefore, there may be a need for a method and apparatus that take into account at least some of the issues discussed above, as well as other possible issues.

SUMMARY

Illustrative embodiments provide a method of controlling movement of a component in a system by a plurality of actuators. An operation actuation command to move the component is received. For each of the plurality of actuators, the operation actuation command is used to generate a feed-forward equalization command for the actuator, the feed-forward equalization command for the actuator is combined with the operation actuation command to provide an equalized actuation command for the actuator, the actuator is controlled to move the component using the equalized actuation command for the actuator.

Illustrative embodiments also provide a method of controlling movement of a component in a system by a plurality of actuators including a calibration mode and an operation mode. In the calibration mode, a mapping table for each of the plurality of actuators is calibrated. For each of a plurality of calibration actuation commands, the plurality of actuators are controlled to move the component using the calibration actuation command. For each of the plurality of actuators, feedback signals are received from the plurality of actuators, the feedback signals are used to generate a feed-forward equalization command for the actuator for the calibration actuation command, and the feed-forward equalization command for the actuator is mapped to an actuation command corresponding to the calibration actuation command in the mapping table. In the operation mode, each of the plurality of actuators is controlled to move the component using the feed-forward equalization command for the actuator generated from the mapping table for the actuator.

Illustrative embodiments also provide an apparatus for controlling movement of a component in a system by a plurality of actuators. The apparatus includes a system controller, a plurality of equalization controllers, and a plurality of actuator controllers. The system controller is configured to generate an operation actuation command to move the component. The plurality of equalization controllers include an equalization controller for each of the plurality of actuators. The equalization controller for each of the plurality of actuators is configured to use the operation actuation command to generate a feed-forward equalization command for the actuator and to combine the feed-forward equalization command for the actuator with the operation actuation command to provide an equalized actuation command for the actuator. The plurality of actuator controllers include an actuator controller for each of the plurality of actuators. The actuator controller for each of the plurality of actuators is configured to control the actuator to move the component using the equalized actuation command for the actuator.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof, will best be understood by reference to the following detailed description of an illustrative embodiment of the present disclosure when read in conjunction with the accompanying drawings, wherein:

DETAILED DESCRIPTION

Figure 1:
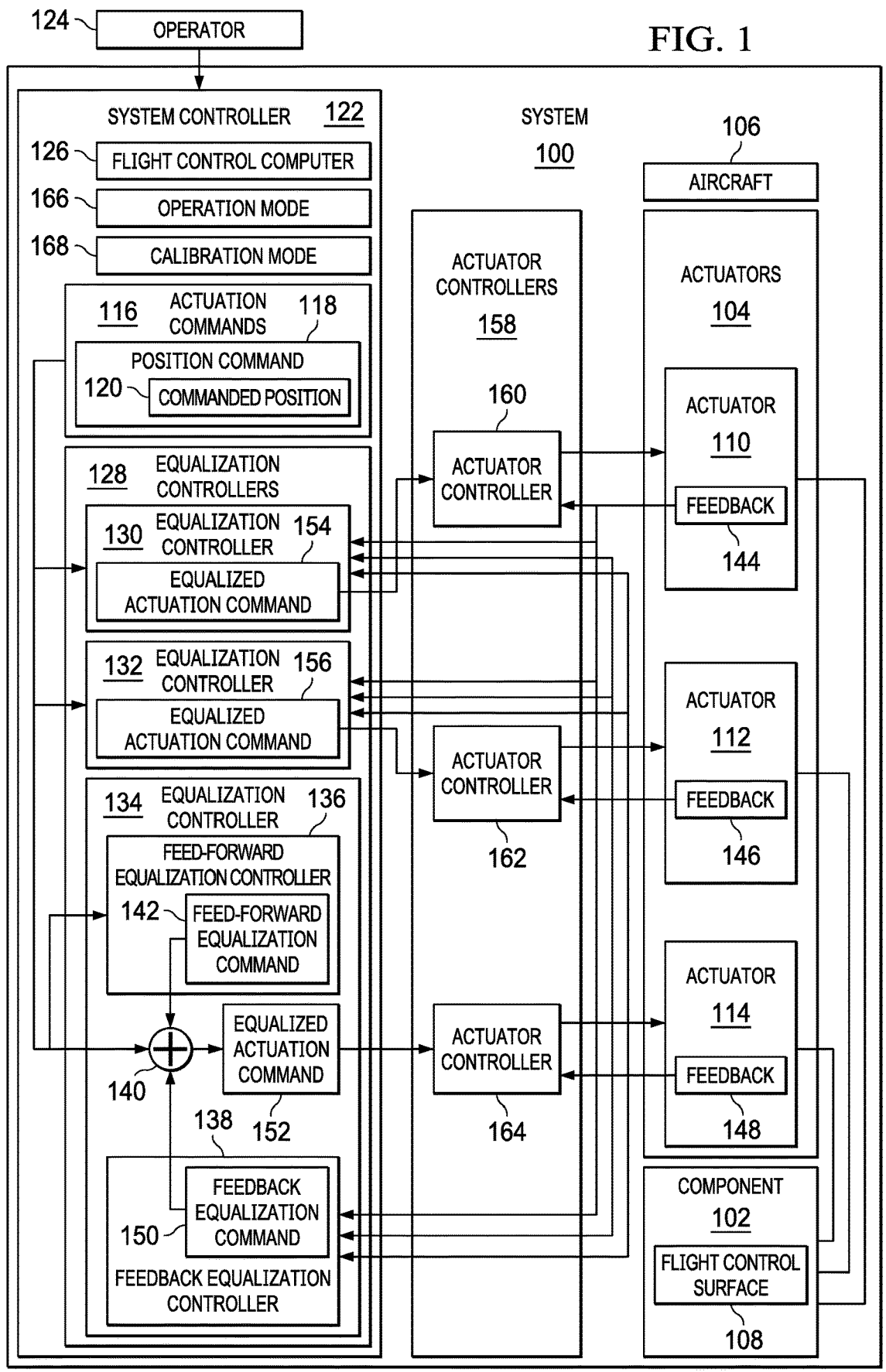
FIG. 1 is an illustration of a block diagram of a system for controlling movement of a component by a plurality of actuators using feed-forward equalization control in accordance with an illustrative embodiment.

The illustrative embodiments recognize and take into account different considerations. For example, the illustrative embodiments recognize and take into account that, in an active-active redundant system for moving a flight control surface, slight differences in the positions of the multiple actuators that are used to move the flight control surface may create force fight fatigue in the flight control surface. Force fight fatigue may lead to metal fatigue damage or premature aging of the flight control surface or its fittings.

Illustrative embodiments also recognize and take into account that force fight fatigue in an active-active redundant system for controlling a flight control surface may be reduced by the use of feedback equalization control. Feedback equalization control may be provided by a feedback equalization controller associated with each of the actuators associated with the flight control surface in the active-active redundant system. Each feedback equalization controller receives feedback from each of the actuators in the system and generates an equalization command that is used to control the actuator with which the feedback equalization controller is associated to equalize the actuator forces on the flight control surface.

Illustrative embodiments also recognize and take into account that fatigue damage may occur instantly. Therefore, it is beneficial to manage force fight through use of anticipatory controllers rather than reactionary controllers.

Illustrative embodiments provide feed-forward equalization control for controlling movement of flight control surfaces and other components by a plurality of actuators in an active-active redundant actuation system. Illustrative embodiments extend feedback equalization control across a plurality of redundant actuators. Use of a feed-forward equalization controller during normal operations in accordance with an illustrative embodiment allows a feedback equalization controller to respond only to changes in the actuation system that occur after the feed-forward equalization controller is calibrated in a calibration mode.

There are two modes associated with the feed-forward equalization in accordance with an illustrative embodiment, operation mode and calibration mode. In operation mode, the feed-forward equalization controller provides a correction command via a mapping table, based upon the current actuation command and an associated previously determined calibration correction. This correction command is summed with the feedback equalization command from the feedback equalization controller to produce the total compensation for the current system input actuation command. Each actuator on the same flight control surface or other component then is controlled using a unique equalized command. In calibration mode, the mapping table used by the feed-forward equalization controller is updated or adjusted to account for any actuation parameter drift due to tolerances or aging that may occur over time.

A feed-forward equalization controller in accordance with an illustrative embodiment allows an actuator control system to correct for anticipated force fight. Feed-forward equalization controllers in accordance with an illustrative embodiment may be used to manage any actuator control system parameter, such as system force fight.

The use of feed-forward equalization controllers in combination with feedback equalization controllers in accordance with an illustrative embodiment reduces the required feed-back control bandwidth. The advantages of a lower bandwidth controller are reflected in increased controller stability. The use of feed-forward equalization controllers, combined with the use of less aggressive feedback equalization controllers, therefore provides a high performing and stable parameter equalization technique, for parameter drift over time and operating environment changes.

Turning to FIG. 1, an illustration of a block diagram of a system for controlling movement of a component by a plurality of actuators using feed-forward equalization control is depicted in accordance with an illustrative embodiment. In accordance with an illustrative embodiment, component 102 of system 100 is moved by plurality of actuators 104.

System 100 may comprise any appropriate machine or other system. Component 102 may comprise any appropriate component of system 100. For example, without limitation, system 100 may comprise aircraft 106. Component 102 may comprise flight control surface 108 for aircraft 106.

Aircraft 106 may be any appropriate type of aircraft that may be configured to perform any appropriate operation or mission. For example, without limitation, aircraft 106 may be a commercial passenger aircraft, a cargo aircraft, a military aircraft, a personal aviation aircraft or any other appropriate type of aircraft. Aircraft 106 may be a fixed wing aircraft, a rotary wing aircraft, or a lighter-than-air aircraft. Aircraft 106 may be a manned aircraft or an unmanned aircraft.

Flight control surface 108 may be any appropriate flight control surface for aircraft 106. For example, without limitation, flight control surface 108 may be an aileron, an elevator, a rudder, a spoiler, flaps, slats, an air brake, or any other appropriate flight control surface.

Actuators 104 may include any appropriate type of actuators for moving component 102. The type and other characteristics of actuators 104 for any particular application may be selected based on the characteristics of component 102 to be moved and the way in which component 102 is to be moved by system 100. For example, without limitation, actuators 104 may include hydraulic actuators, electric motors, or any other appropriate type of actuator.

Plurality of actuators 104 may be configured and coupled to component 102 in an appropriate manner to provide active-active redundant control of the movement of component 102. In other words, plurality of actuators 104 may be operated at the same time to move component 102.

In this example, actuators 104 include actuator 110, actuator 112, and actuator 114. However, illustrative embodiments are not limited to systems with three actuators. Illustrative embodiments may be used in systems that use any appropriate number of plurality of actuators 104 to move component 102. For example, illustrative embodiments may include systems with two actuators or with more than three actuators for controlling component 102.

Actuators 104 are controlled to move component 102 in accordance with actuation commands 116. Actuation commands 116 may define any desired and appropriate movement for component 102. For example, without limitation, actuation commands 116 may include position command 118. Position command 118 may define a desired commanded position 120 for component 102. In this example, actuators 104 are controlled to operate simultaneously to move component 102 to commanded position 120 as defined by position command 118.

Actuation commands 116 may be generated by system controller 122. For example, actuation commands 116 may be generated by system controller 122 in response to input from operator 124. Operator 124 may be any appropriate operator of system 100. Operator 124 may be a human operator, a machine operator, or a human operator in combination with a machine. Alternatively, or in addition, actuation commands 116 may be generated automatically by system controller 122.

In the case where system 100 is aircraft 106, system controller 122 may be flight control computer 126. Flight control computer 126 may be configured to generate actuation commands 116 for controlling flight control surface 108 to achieve a desired flight path for aircraft 106. Flight control computer 126 may generate actuation commands 116 in response to input from operator 124. In this example, operator 124 may be a human or automatic pilot.

In accordance with an illustrative embodiment, actuation commands 116 are provided to equalization controllers 128. Equalization controllers 128 may be implemented in any appropriate manner to implement the functionality of equalization controllers 128 as described herein. For example, equalization controllers 128 may be implemented as part of system controller 122 or separate from system controller 122, in whole or in part.

Equalization controllers 128 include an equalization controller for each of plurality of actuators 104 to be controlled. In this example, equalization controller 130 is for controlling actuator 110, equalization controller 132 is for controlling actuator 112, and equalization controller 134 is for controlling actuator 114. Illustrative embodiments may include fewer or more than three equalization controllers 128. Illustrative embodiments may include any appropriate number of equalization controllers 128, depending on the number of actuators 104 to be controlled.

In accordance with an illustrative embodiment, each of equalization controllers 128 may include feed-forward equalization controller 136, feedback equalization controller 138, and combiner 140. Although these components are only shown for equalization controller 134 in FIG. 1, equalization controller 130 and equalization controller 132 each may also include a feed-forward equalization controller, feedback equalization controller, and combiner, as described.

Feed-forward equalization controller 134 is configured to receive actuation command 116 and to use actuation command 116 to generate feed-forward equalization command 142. Feedback equalization controller 138 is configured to receive feedback from actuators 104. For example, feedback equalization controller 138 may receive feedback 144 from actuator 110, feedback 146 from actuator 112, and feedback 148 from actuator 114. Feedback equalization controller 138 is configured to use the feedback received from actuators 104 to generate feedback equalization command 150. Combiner 140 is configured to combine feed-forward equalization command 142 with feedback equalization command 150 and the received actuation command 116 to generate equalized actuation command 152 for controlling actuator 114. Equalization controller 130 generates equalized actuation command 154 for controlling actuator 110 and equalization controller 132 generates equalized actuation command 156 for controlling actuator 112 in a similar manner.

Equalized actuation commands 152, 154, and 156 are provided to actuator controllers 158 for controlling actuators 104. Actuator controllers 158 include an actuator controller for each of actuators 104 to be controlled. Actuator controllers 158 may be implemented in any appropriate manner to control actuators 104.

For example, equalized actuation command 154 is provided to actuator controller 160 for actuator 110. Actuator controller 160 is configured to control actuator 110 in accordance with received equalized actuation command 154 using feedback 144 from actuator 110. Equalized actuation command 156 is provided to actuator controller 162 for actuator 112. Actuator controller 162 is configured to control actuator 112 in accordance with received equalized actuation command 156 using feedback 146 from actuator 112. Equalized actuation command 152 is provided to actuator controller 164 for actuator 114. Actuator controller 164 is configured to control actuator 114 in accordance with received equalized actuation command 152 using feedback 148 from actuator 114.

Control of actuator 114 using equalization controller 134 in accordance with an illustrative embodiment is described in more detail below. Control of actuator 114 using equalization controller 134 in operation mode 166 is described in more detail below with reference to FIG. 2. Control of actuator 114 using equalization controller 134 in calibration mode 166 is described in more detail below with reference to FIG. 3.

The illustration of system 100 in FIG. 1 is not meant to imply physical or architectural limitations to the manner in which illustrative embodiments may be implemented. Other components, in addition to or in place of the ones illustrated, may be used. Some components may be optional. Also, the blocks are presented to illustrate some functional components. One or more of these blocks may be combined, divided, or combined and divided into different blocks when implemented in an illustrative embodiment.

Figure 2:
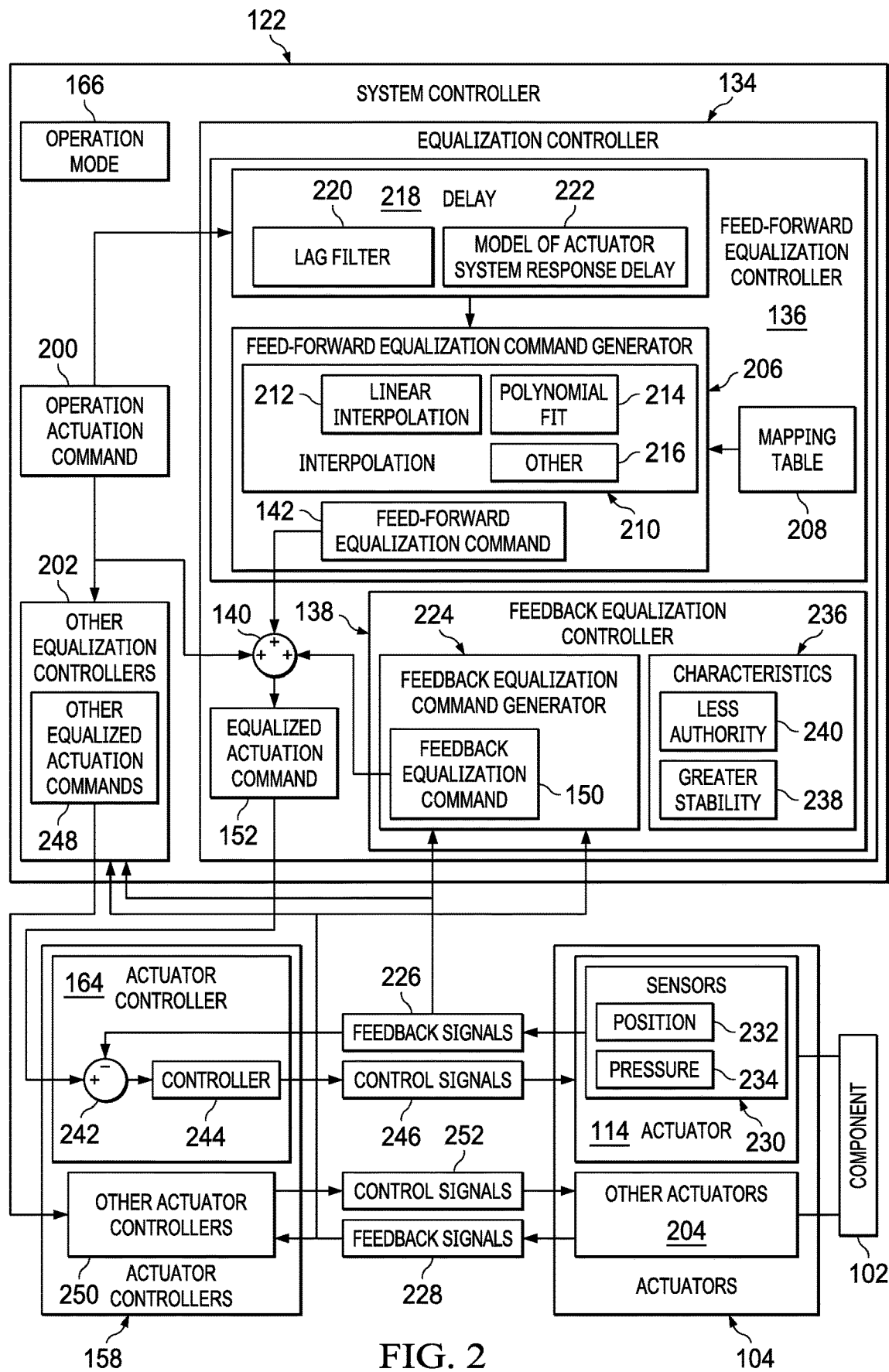
FIG. 2 is an illustration of a block diagram of a system controller including feed-forward equalization for actuator control in an operation mode in accordance with an illustrative embodiment.

Turning to FIG. 2, an illustration of a block diagram of a system controller including feed-forward equalization for actuator control in an operation mode is depicted in accordance with an illustrative embodiment. An actuation command generated by system controller 122 in operation mode 166 may be referred to as operation actuation command 200. Operation actuation command 200 is provided to equalization controller 134 for actuator 114 and to other equalization controllers 202 for other actuators 204 in plurality of actuators 104 for moving component 102.

Operation actuation command 200 is received by feed-forward equalization controller 136 in equalization controller 134. Feed-forward equalization controller 136 included feed-forward equalization command generator 206. Feed-forward equalization command generator 206 is configured to generate feed-forward equalization command 142 for actuator 114 from operation actuation command 200.

Feed-forward equalization command generator 206 may be configured to use operation actuation command 200 to generate feed-forward equalization command 142 using mapping table 208. Mapping table 208 may comprise a mapping of feed-forward equalization commands for actuator 114 to various actuation commands. Feed-forward equalization command generator 206 thus may generate feed-forward equalization command 142 by identifying the feed-forward equalization command that is mapped to the actuation command corresponding to operation actuation command 200 in mapping table.

If operation actuation command 200 does not correspond to an actuation command in mapping table 208, feed-forward equalization command 142 may be generated by interpolation from feed-forward equalization commands that are mapped to actuation commands in mapping table 208 that are close to operation actuation command 200. Any appropriate type of interpolation 210 may be used. The type of interpolation 210 to use in any particular case may be selected based on the relationship of feed-forward equalization commands to actuation commands in mapping table 208. For example, interpolation 210 may include linear interpolation 212, polynomial fit 214, or other 216 appropriate form of interpolation 210.

Feed-forward equalization command 142 is provided to combiner 140 to be combined with operation actuation command 200 and feed-back equalization command 150 to form equalized actuation command 152 for actuator 114. Feed-forward control is preemptive by design. Therefore, actuator system response delay effects may be taken into consideration to obtain a smooth feed-forward control response. Delay 218 may be provided in feed-forward equalization controller 136 to delay combining feed-forward equalization command 142 into equalized actuation command 152. For example, without limitation, delay 218 may be implemented by lag filter 220 on the input of operation actuation command 200 to feed-forward equalization controller 136. Delay 218 may be based on model of actuator system response delay 222.

Feedback equalization controller 138 may include feedback equalization command generator 224. Feedback equalization command generator 224 may be configured to generate feedback equalization command 150 from feedback signals 226 from actuator 114 and feedback signals 228 from other actuators 204. Feedback signals 226 may be provided by appropriate sensors 230 associated with actuator 114. For example, feedback signals 226 may indicate an actual position 232 of actuator 114, pressure 234 associated with actuator 114, both position 232 and pressure 234, or other appropriate feedback or combinations of feedback as provided by appropriate sensors 230. Feedback signals 228 may be provided from other actuators 204 using appropriate sensors in the same way.

Feedback equalization command generator 224 may be configured to generate feedback equalization command 150 from feedback signals 226 and 228 in any appropriate manner. For example, without limitation, feedback equalization command 150 for actuator 114, in combination with feedback equalization commands for other actuators 204, may be configured to provide force equalization for actuators 104 moving component 102. For example, feedback equalization command 150 may be a corrective position command to reduce the differences between sensed forces in actuators 104.

For example, without limitation, feedback equalization command generator 224 may be configured to generate feedback equalization command 150 using the method described in U.S. Pat. No. 8,245,967, Actuator Force Equalization Controller, which is incorporated by reference herein in its entirety. In this example, a plurality of position sensors coupled to the actuators provide rate feedback signals proportional to an actuator rate. A plurality of force sensors coupled to the actuators provide delta pressure signals. A feedback control loop is configured to receive the rate feedback signals and delta pressure signals and compute a difference in actual actuator rates and sum the difference with a computed difference in actuator forces to generate actuator positioning commands that equalize the actuator forces on a control surface.

In operation mode 166, characteristics 236 of feedback equalization controller 138 may provide greater stability 238, less authority 240, or both in comparison to characteristics 236 of feedback equalization controller 138 in calibration mode 168.

Feedback equalization command 150 is combined with feed-forward equalization command 142 and operation actuation command 200 by combiner 140 to provide equalized actuation command 152 for actuator 114. Equalized actuation command 152 is provided to actuator controller 164 for actuator 114. Actuator controller 164 may determine difference 242 between equalized actuation command 152 and the actual position or other condition of actuator 114 as indicated by feedback signals 226. Actuator controller 164 may include appropriate controller 244 to generate appropriate control signals 246 to control actuator 114 to minimize difference 242 between equalized actuation command 152 and feedback signals 226 in any appropriate manner.

Other equalization controllers 202 may generate other equalization commands 248 for other actuators 204 in a similar manner. Other equalization commands 248 may be used by other actuator controllers 250 to generate appropriate control signals 252 for controlling other actuators 204 in a similar manner.

Figure 3:
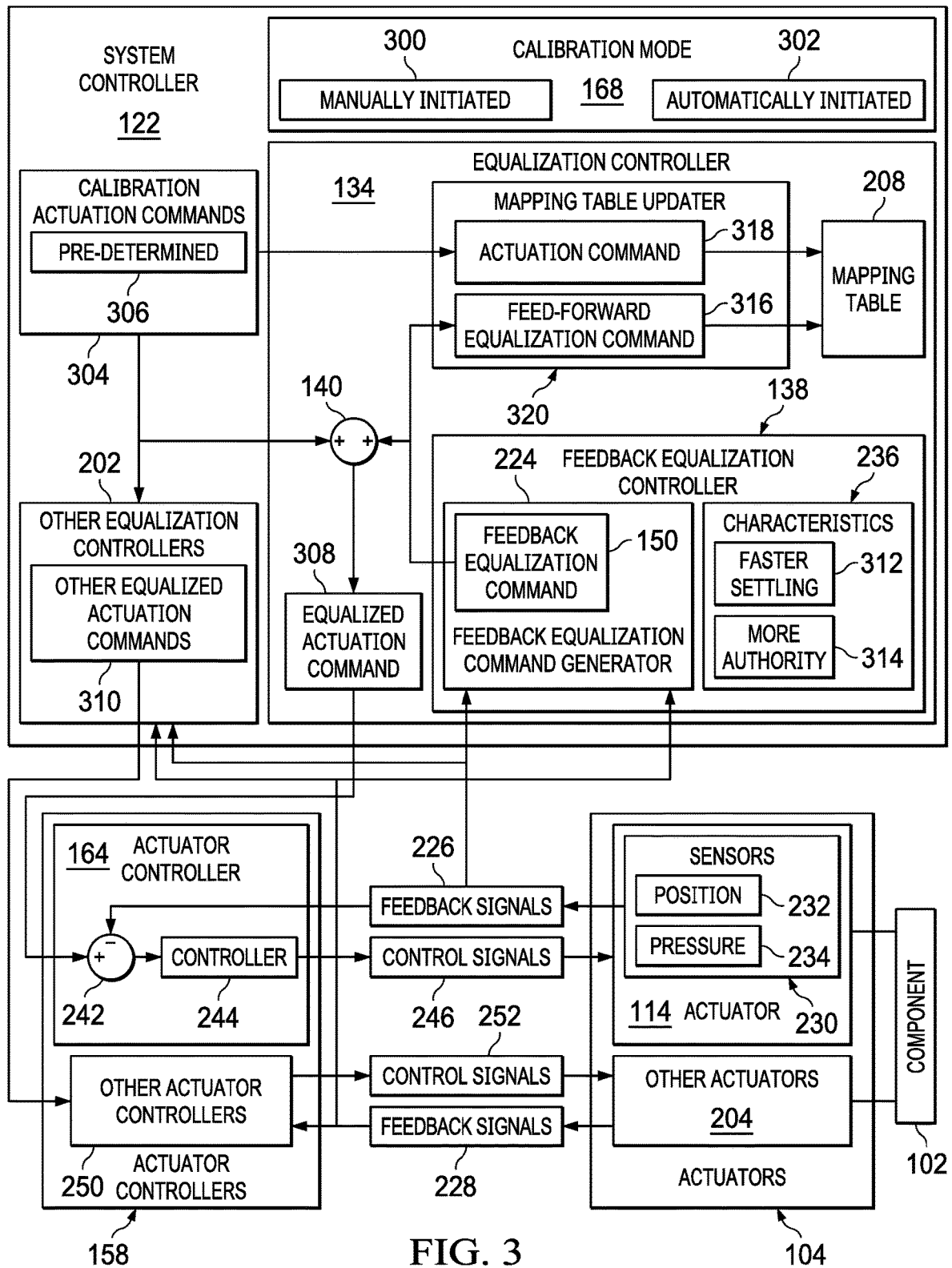
FIG. 3 is an illustration of a block diagram of a system controller including feed-forward equalization for actuator control in a calibration mode in accordance with an illustrative embodiment.

Turning to FIG. 3, an illustration of a block diagram of a system controller including feed-forward equalization for actuator control in a calibration mode is depicted in accordance with an illustrative embodiment. Calibration mode 168 is used to update mapping table 208 that is used to generate feed-forward equalization commands for actuator 114 in operation mode 166.

Calibration mode 168 may be manually initiated 300 or automatically initiated 302. For example, without limitation, calibration mode 168 may be manually initiated 300 by maintenance personnel as part of a maintenance schedule.

Where component 102 is a flight control surface, calibration mode 168 may be automatically initiated 302 when a controls check is performed by a pilot. A controls check may be performed before a flight and typically results in a control surface being swept end-to-end. Calibration mode 168 may be automatically initiated 302 and performed to update mapping table 208 during this controls check procedure.

Actuation commands generated by system controller 122 in calibration mode 168 may be referred to as calibration actuation commands 304. Calibration actuation commands 304 may be pre-determined 306.

Each of calibration actuation commands 304 is combined with a feedback equalization command 150 to generate equalized actuation command 308 for actuator 114. Equalization command 308 does not include a feed-forward equalization command component in calibration mode 168. Equalized actuation command 308 is provided to actuator controller 164 to control actuator 114 in the manner described above. Other equalization controllers 202 may generate other equalized actuation commands 310 for other actuators 204 in a similar manner.

Feedback equalization command 150 may be generated by feedback equalization controller 138 in the manner described above. However, in calibration mode 168, characteristics 236 of feedback equalization controller 138 may be changed to provide faster settling 312, more authority 314, or both, in comparison to operation mode 166.

For each of calibration actuation commands 304 used to control actuator 114, the resulting feedback equalization command 150, after feedback equalization controller 138 has settled, is mapped as feed-forward equalization command 316 to actuation command 318 corresponding to the calibration command in mapping table 208. This updating of mapping table 208 may be performed by mapping table updater 320.

Figure 4:
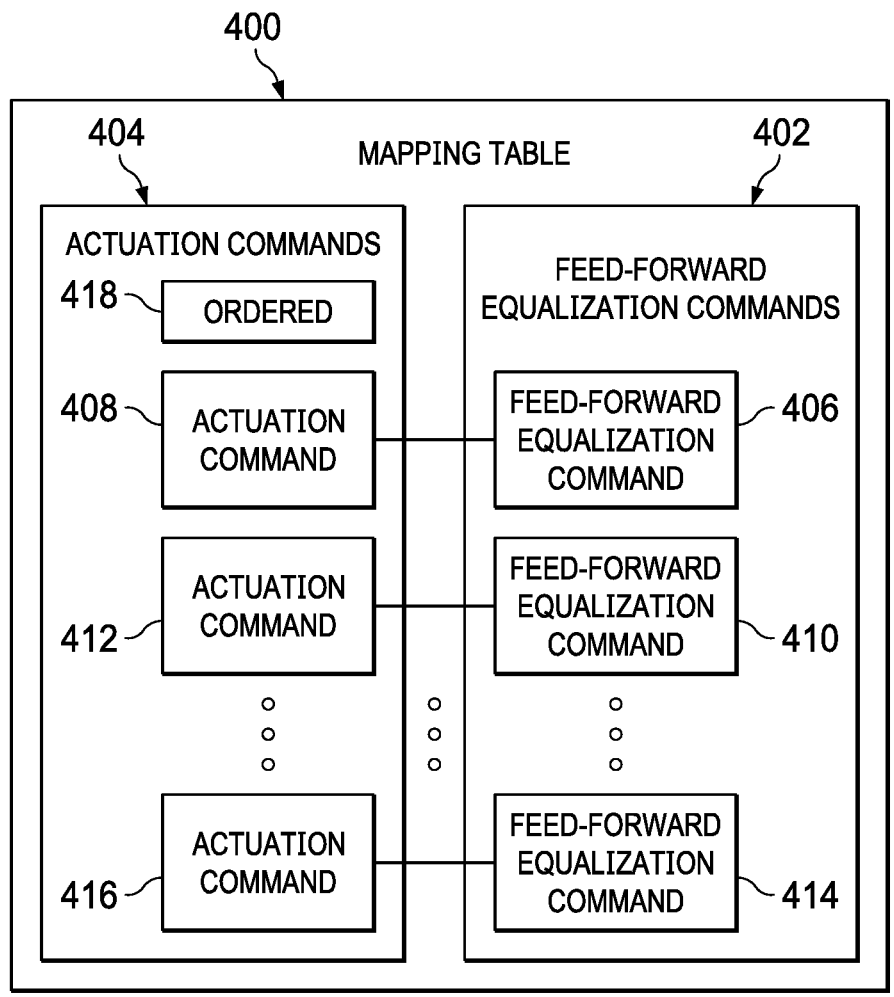
FIG. 4 is an illustration of a mapping table for a feed-forward equalization controller in accordance with an illustrative embodiment.

Turning to FIG. 4, an illustration of a mapping table for a feed-forward equalization controller is depicted in accordance with an illustrative embodiment. Mapping table 400 is an example of one implementation of mapping table 208 in FIGS. 2 and 3.

Mapping table 400 includes a mapping of feed-forward equalization commands 402 to corresponding actuation commands 404. For example, feed-forward equalization command 406 is mapped to actuation command 408. Feed-forward equalization command 410 is mapped to actuation command 412. Feed-forward equalization command 414 is mapped to actuation command 416.

Actuator commands 404 may be ordered 418 in mapping table 400 in any appropriate manner. For example, without limitation, actuator commands 404 may be ordered 418 by value in mapping table to make it easier to identify an actuator command 404 in mapping table 400 that matches an operation actuation command or actuator commands 404 in mapping table 400 that are close to the value of an operation actuation command.

Figure 5:
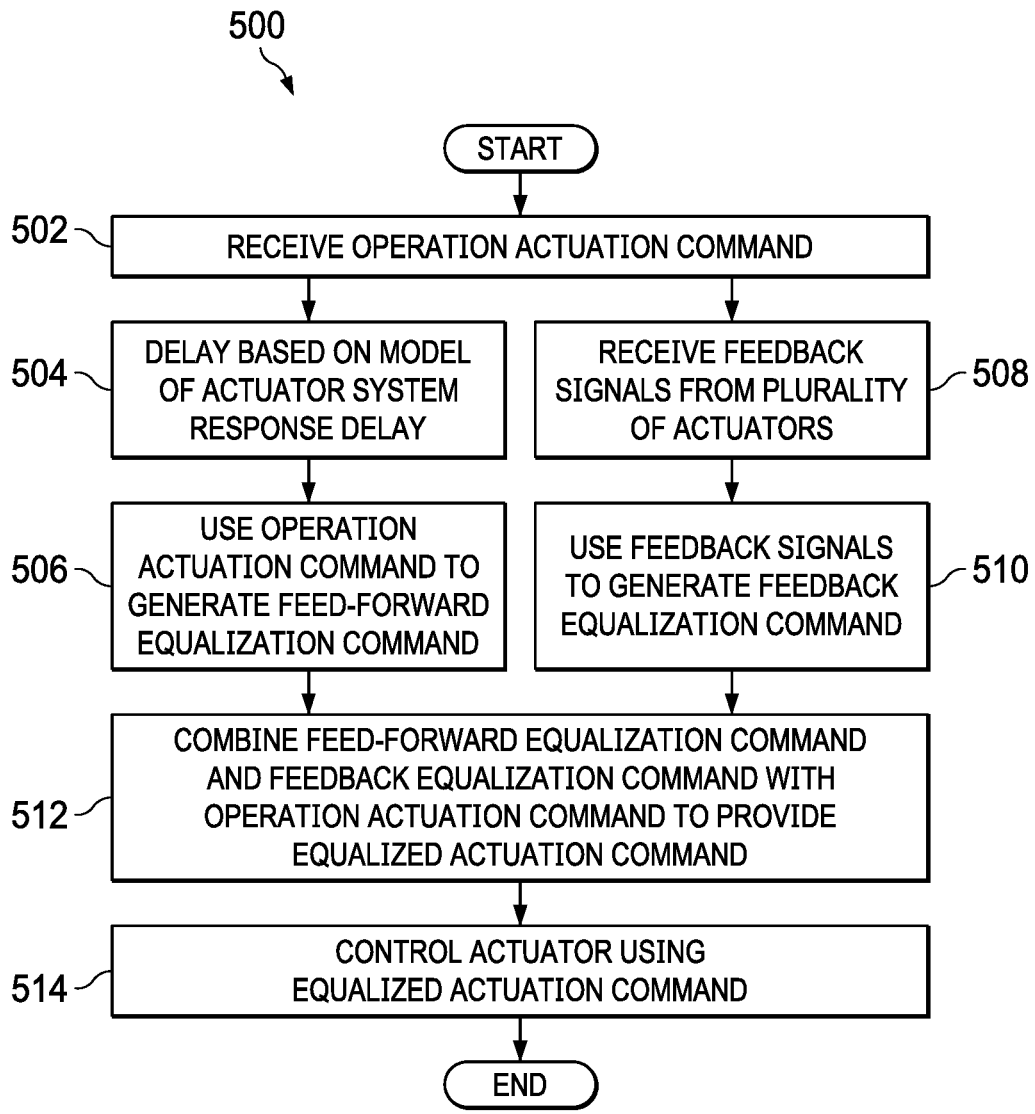
FIG. 5 is an illustration of a flowchart of a process of controlling movement of a component by a plurality of actuators using feed-forward equalization control in accordance with an illustrative embodiment.

Turning to FIG. 5, an illustration of a flowchart of a process of controlling movement of a component by a plurality of actuators using feed-forward equalization control is depicted in accordance with an illustrative embodiment. Process 500 may be performed by equalization controller 134 in operation mode 166 in FIG. 2.

Process 500 may begin with receiving an operation actuation command (operation 502). A delay based on a model of actuator system response delay may be provided (operation 504). After the delay of operation 504, the operation actuation command may be used to generate a feed-forward equalization command (operation 506).

Feedback signals also may be received from a plurality of actuators (operation 508). The feedback signals may be used to generate a feedback equalization command (operation 510).

The feed-forward equalization command may be combined with the feedback equalization command and the operation actuation command to generate an equalized actuation command (operation 512). The actuator is then controlled using the equalized actuation command (operation 514), with the process terminating thereafter.

Figure 6:
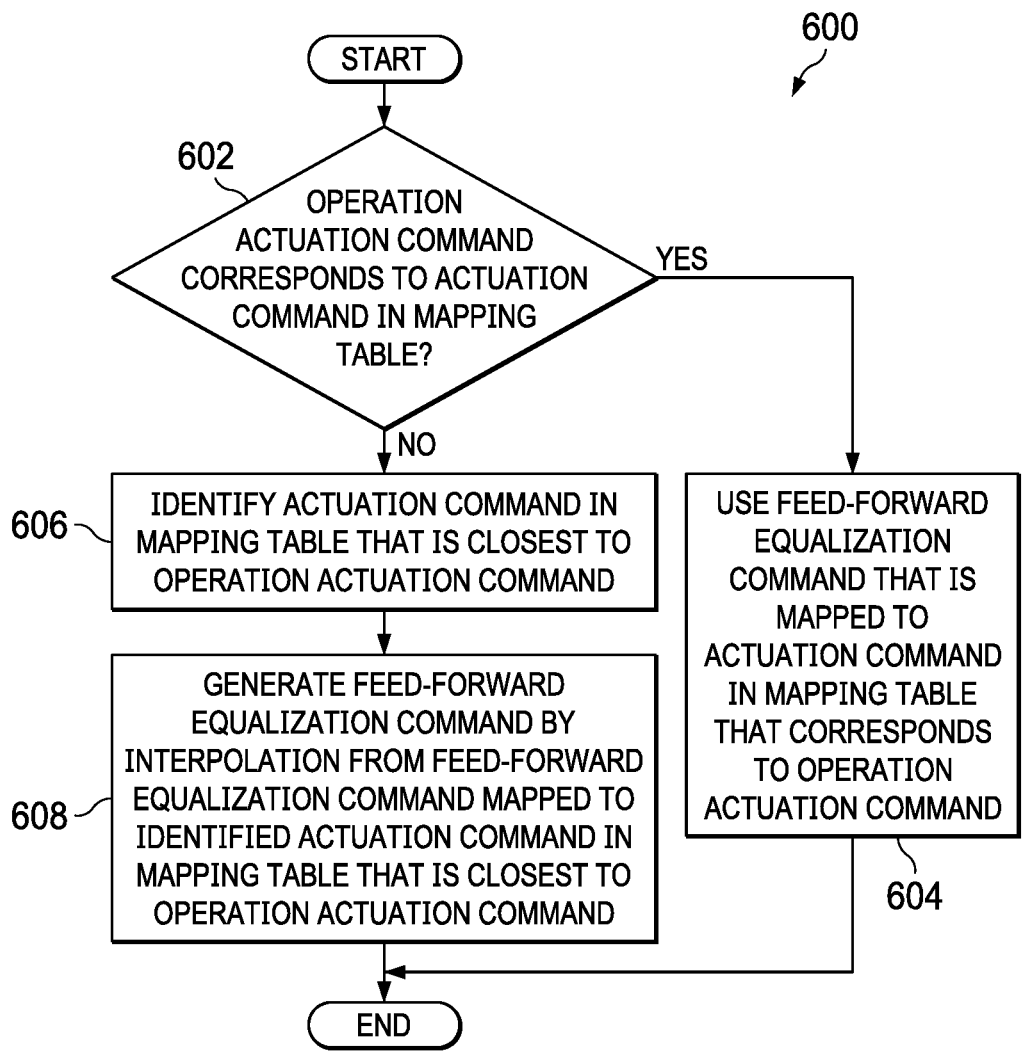
FIG. 6 is an illustration of a flowchart of a process of generating a feed-forward equalization command using a mapping table in accordance with an illustrative embodiment.

Turning to FIG. 6, an illustration of a flowchart of a process of generating a feed-forward equalization command using a mapping table is depicted in accordance with an illustrative embodiment. Process 600 is an example of one implementation of operation 506 in process 500 in FIG. 5.

Process 600 may begin with determining whether an operation actuation command corresponds to an actuation command in a mapping table (operation 602). In response to a determination that the operation actuation command does correspond to an actuation command in the mapping table, the feed-forward equalization command that is mapped to the actuation command in the mapping table that corresponds to the operation actuation command is used as the feed-forward equalization command for the actuator (operation 604), with the process terminating thereafter.

In response to a determination at operation 602 that the operation actuation command does not correspond to an actuation command in the mapping table, an actuation command in the mapping table that is closest value to the operation actuation command value is identified (operation 606). The feed-forward equalization command for the actuator is then generated by interpolation from the feed-forward equalization command mapped to the identified actuation command in the mapping table that is closest to the operation actuation command (operation 608), with the process terminating thereafter.

Figure 7:
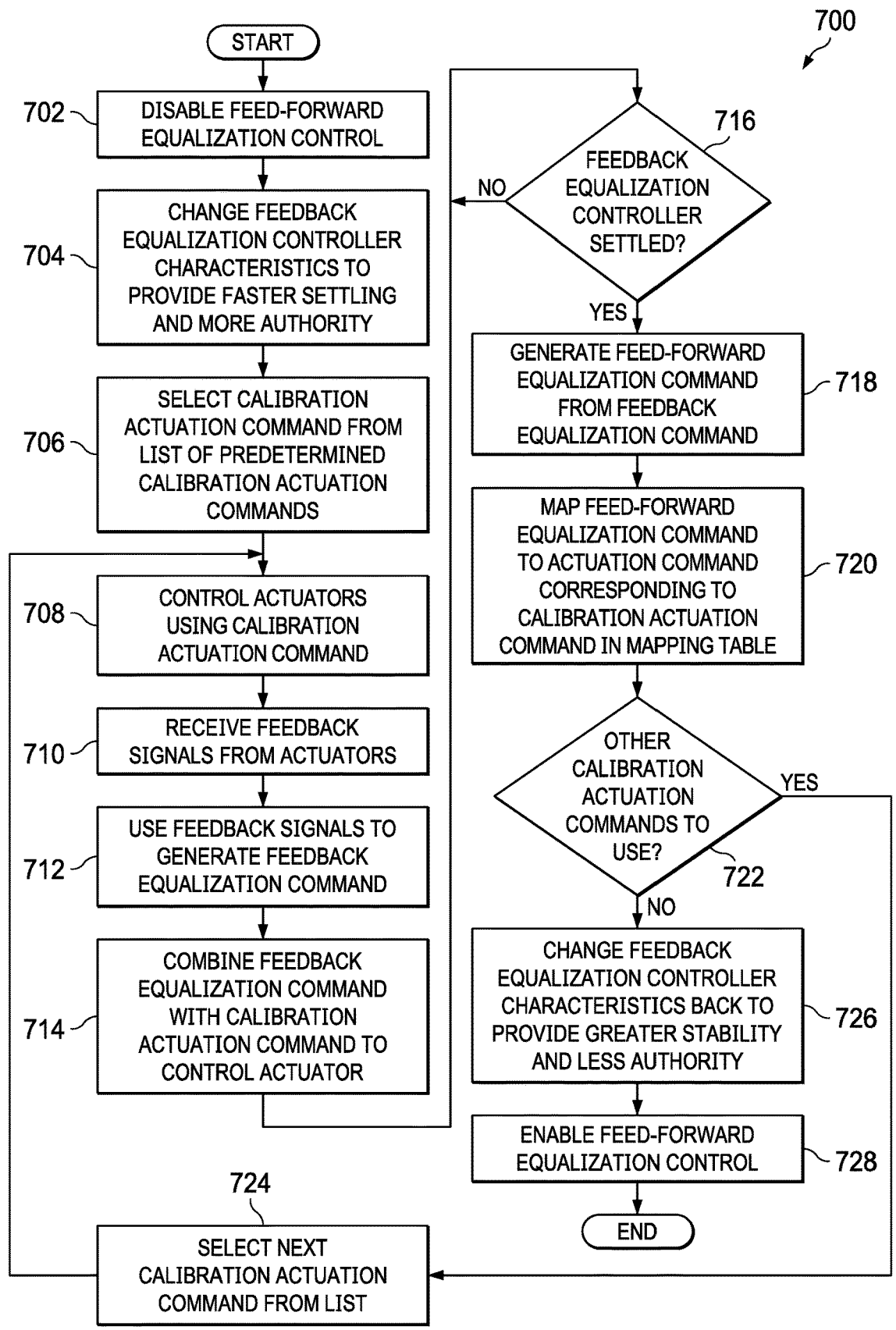
FIG. 7 is an illustration of a flowchart of a process of calibrating a mapping table for a feed-forward equalization controller in accordance with an illustrative embodiment.

Turning to FIG. 7, an illustration of a flowchart of a process of calibrating a mapping table for a feed-forward equalization controller is depicted in accordance with an illustrative embodiment.

Process 700 begins with disabling feed-forward equalization control (operation 702). The feedback equalization controller characteristics are changed to provide faster settling and more authority (operation 704). A calibration actuation command is then selected from a list of pre-determined calibration actuation commands (operation 706).

The actuators are controlled using the selected calibration actuation command (operation 708). Feedback signals are received from the actuators (operation 710) and used to generate a feedback equalization command (operation 712).

The feedback equalization command is combined with the calibration actuation command to control the actuator (operation 714).

It is then determined whether the feedback equalization controller is settled (operation 716). The feedback equalization controller may be considered to be settled when the output of the feedback equalization controller is only changing by a relatively small amount. When the feedback equalization controller is settled, a feed-forward equalization command is generated from the feedback equalization command generated by the feedback equalization controller (operation 718). The feed-forward equalization command is mapped to an actuation command corresponding to the calibration actuation command in the mapping table (operation 720).

It is then determined whether there are any more calibration actuation commands to use (operation 722). If there are more calibration actuation commands to use, the next calibration actuation command is selected from the list (operation 724) and the process returns to operation 708. If there are no more calibration actuation commands to use the feedback equalization controller characteristics are changed back to provide greater stability and less authority (operation 726). Feed-forward equalization control then may be enabled (operation 728), with the process terminating thereafter.

Figure 8:
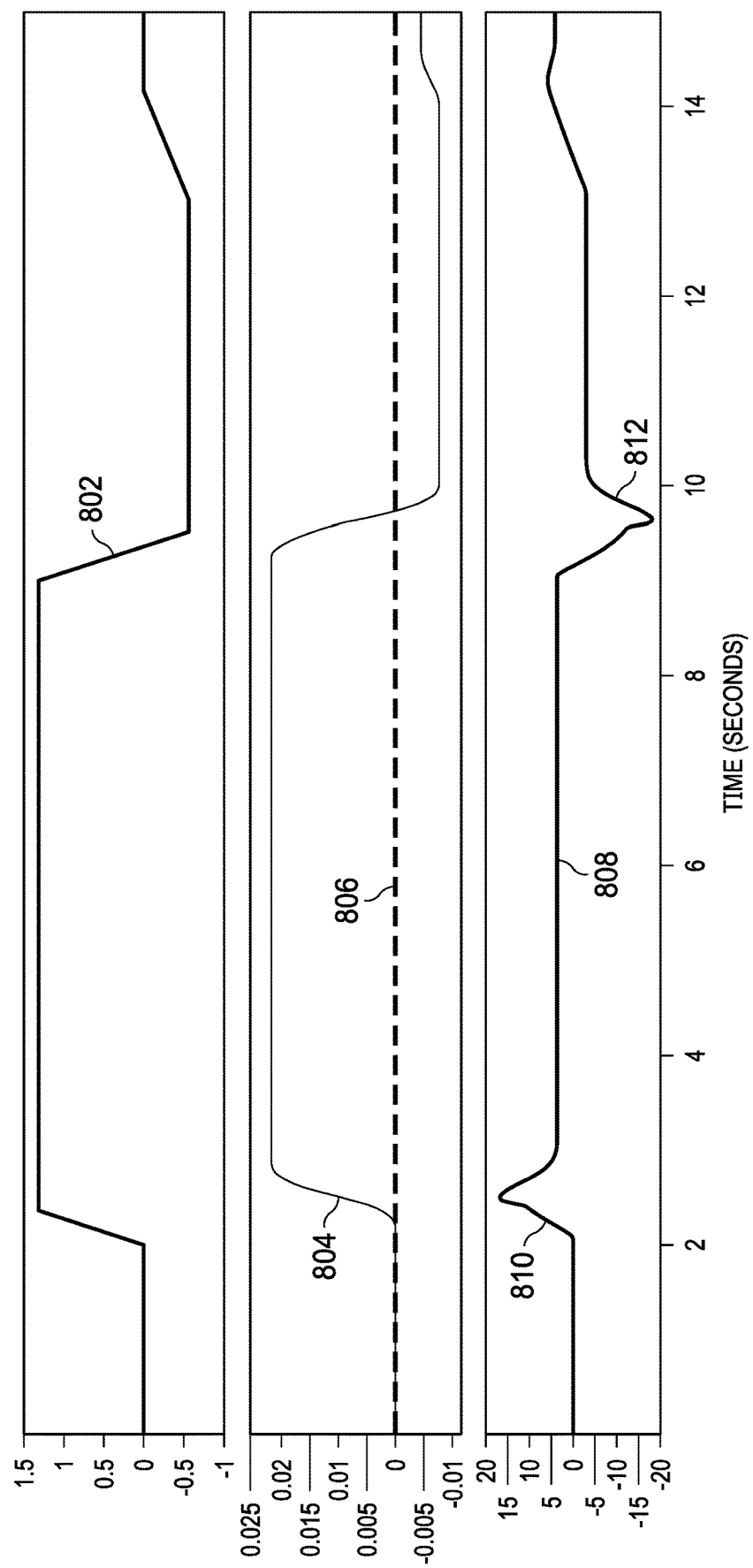
FIG. 8 is an illustration of actuation command signals and observed force fight in a simulation of a system for controlling the movement of a control surface by a plurality of actuators using feedback equalization control but not using feed-forward equalization control in accordance with an illustrative embodiment.

Turning to FIG. 8, an illustration of actuation command signals and observed force fight in a simulation of a system for controlling the movement of a control surface by a plurality of actuators using feedback equalization control but not using feed-forward equalization control is depicted in accordance with an illustrative embodiment. The simulation example is for a force equalization controller system on a multi-actuator control surface. A single actuator is subjected to a position gain error in order to induce force fight in the system. The control surface is then swept end-to-end to observe the controller compensation performance.

Input command 802, feedback command 804, feed-forward command 806, and observed force fight 808 as a percentage of stall force for the simulation are shown. In this example, feed-forward equalization control is not provided, therefore, feed-forward command 806 is at zero throughout the simulation. Note the relatively large spike in observed force fight 808 at 810 and 812 corresponding to changes in input command 802. In this example, when the force equalization controller is comprised of only feedback control, the maximum observed force fight is about 20% of stall force.

Figure 9:
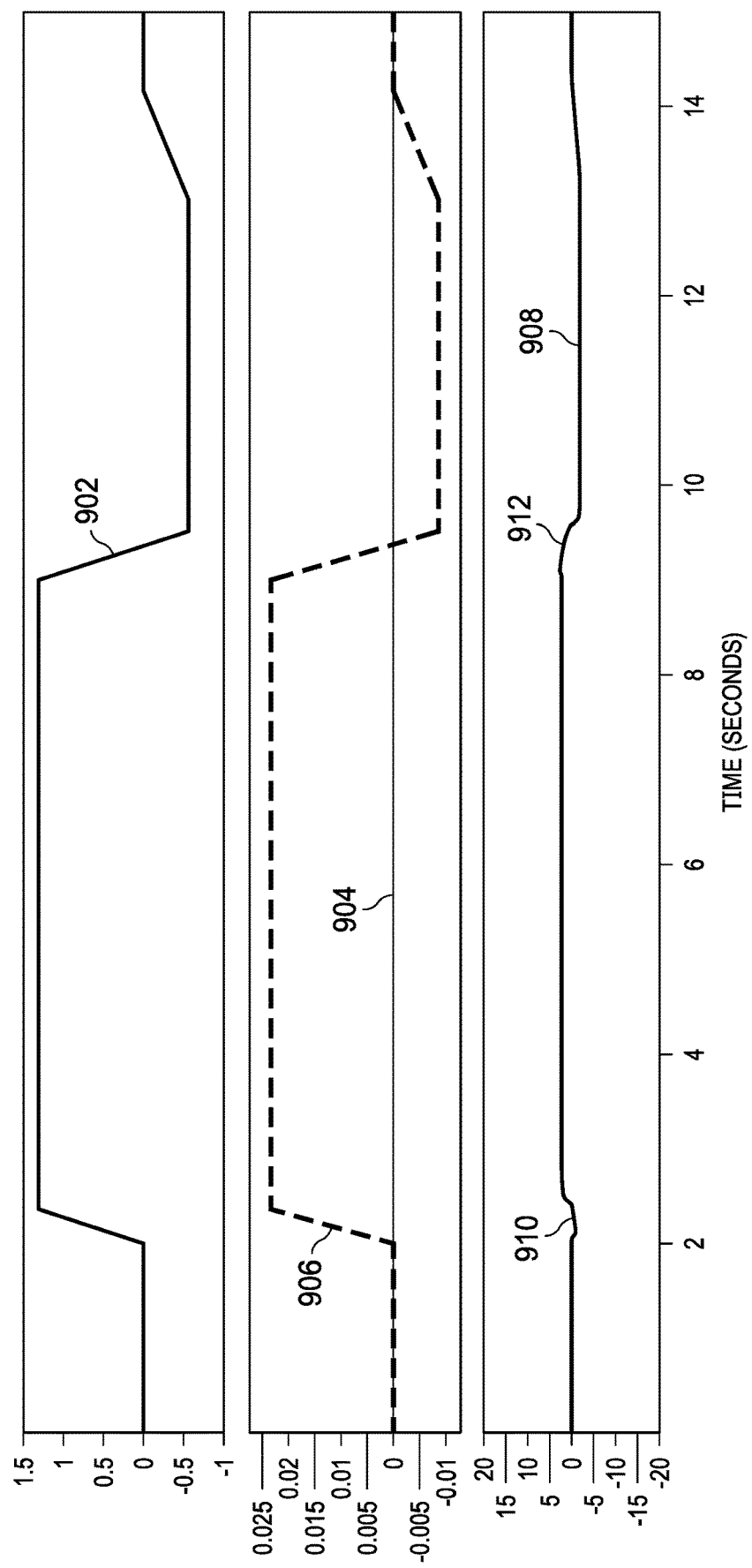
FIG. 9 is an illustration of actuation command signals and observed force fight in a simulation of a system for controlling the movement of a control surface by a plurality of actuators using feedback equalization control and feed-forward equalization control in accordance with an illustrative embodiment.

Turning to FIG. 9, an illustration of actuation command signals and observed force fight in a simulation of a system for controlling the movement of a control surface by a plurality of actuators using feedback equalization control and feed-forward equalization control is depicted in accordance with an illustrative embodiment. As in the simulation described with reference to FIG. 8, the simulation example is for a force equalization controller system on a multi-actuator control surface. A single actuator is subjected to a position gain error in order to induce force fight in the system. The control surface is then swept end-to-end to observe the controller compensation performance.

Input command 902, feed-back command 904, feed-forward command 906, and observed force fight 908 as a percentage of stall force for the simulation are shown. In this example, feedback and feed-forward equalization control are active. Note the relatively small observed force fight 908 at 910 and 912 corresponding to changes in input command 902. In this example, when the force equalization controller system includes both feedback control and feed-forward control, the maximum observed force fight is about 3% of stall force.

Figure 10:
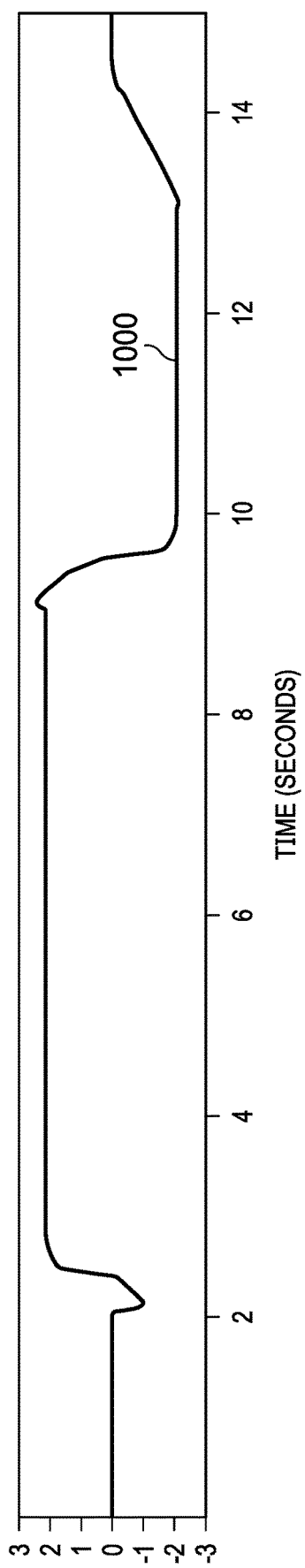
FIG. 10 is an illustration of feed-forward control response in a simulation of a system for controlling the movement of a control surface by a plurality of actuators using feed-forward equalization control without a lag filter to model actuator system response delay in accordance with an illustrative embodiment.

Turning to FIG. 10, an illustration of feed-forward control response 1000 in a simulation of a system for controlling the movement of a control surface by a plurality of actuators using feed-forward equalization control without a lag filter to model actuator system response delay is depicted in accordance with an illustrative embodiment.

Figure 11:
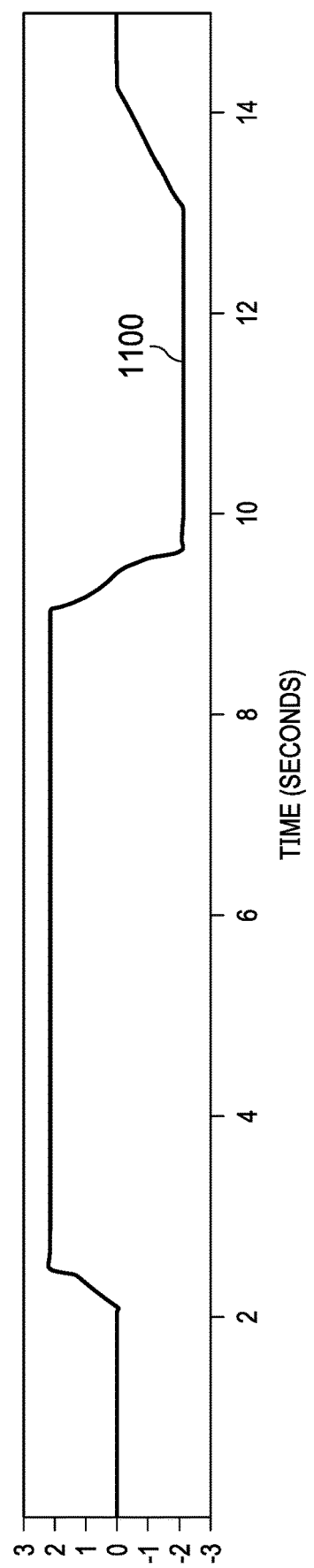
FIG. 11 is an illustration of feed-forward control response in a simulation of a system for controlling the movement of a control surface by a plurality of actuators using feed-forward equalization control with a lag filter to model actuator system response delay in accordance with an illustrative embodiment.

Turning to FIG. 11, an illustration of feed-forward control response 1100 in a simulation of a system for controlling the movement of a control surface by a plurality of actuators using feed-forward equalization control with a lag filter to model actuator system response delay is depicted in accordance with an illustrative embodiment.

Figure 12:
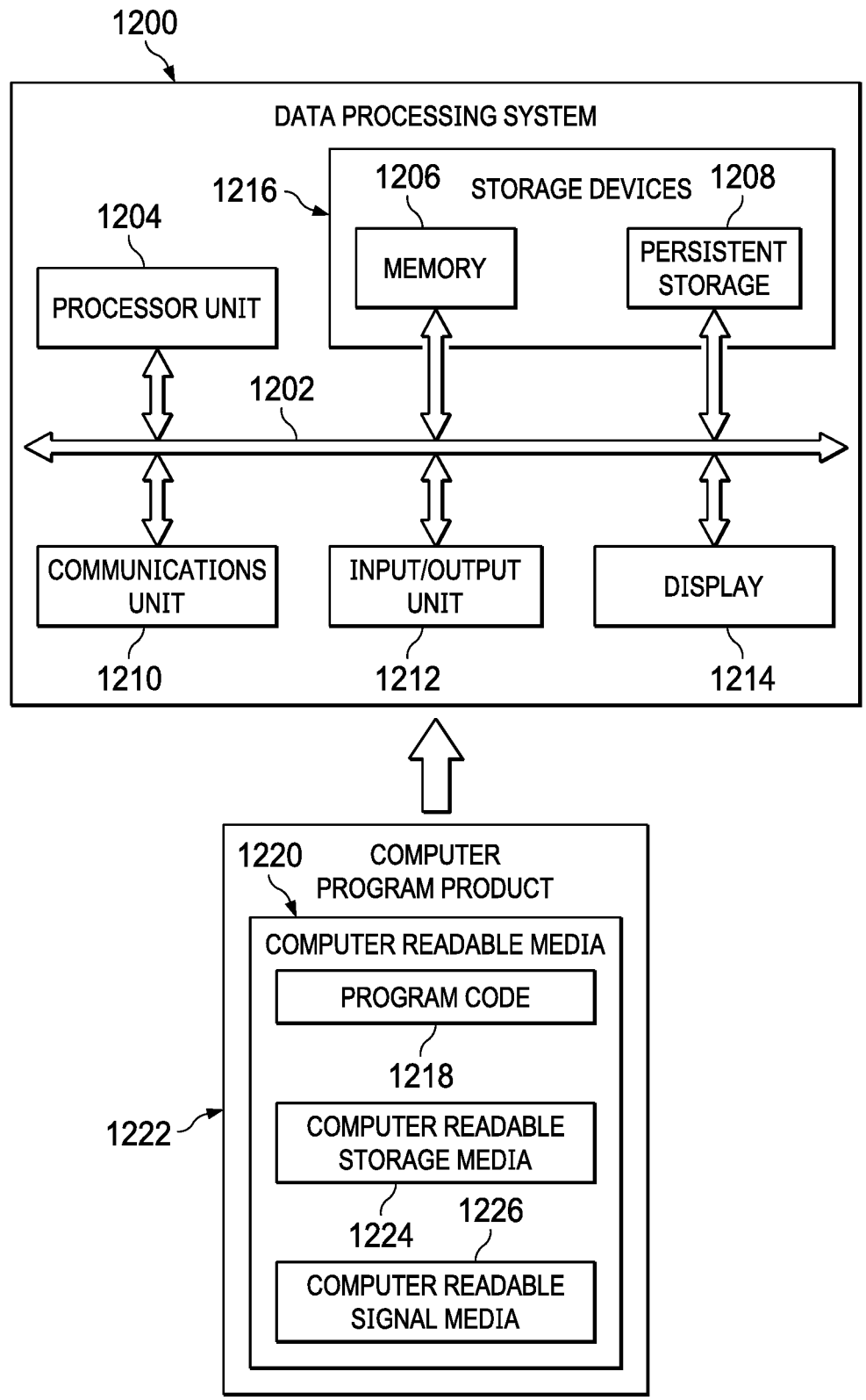
FIG. 12 is an illustration of a block diagram of a data processing system in accordance with an illustrative embodiment.

Turning to FIG. 12, an illustration of a block diagram of a data processing system is depicted in accordance with an illustrative embodiment. Data processing system 1200 is an example of one possible implementation of a data processing system for performing the functions of system controller 122 in system 100 in FIG. 1. For example, without limitation, data processing system 1200 is an example of one possible implementation of a data processing system for implementing flight control computer 126 in aircraft 106 in FIG. 1.

In this illustrative example, data processing system 1200 includes communications fabric 1202. Communications fabric 1202 provides communications between processor unit 1204, memory 1206, persistent storage 1208, communications unit 1210, input/output (I/O) unit 1212, and display 1214. Memory 1206, persistent storage 1208, communications unit 1210, input/output (I/O) unit 1212, and display 1214 are examples of resources accessible by processor unit 1204 via communications fabric 1202.

Processor unit 1204 serves to run instructions for software that may be loaded into memory 1206. Processor unit 1204 may be a number of processors, a multi-processor core, or some other type of processor, depending on the particular implementation. Further, processor unit 1204 may be implemented using a number of heterogeneous processor systems in which a main processor is present with secondary processors on a single chip. As another illustrative example, processor unit 1204 may be a symmetric multi-processor system containing multiple processors of the same type.

Memory 1206 and persistent storage 1208 are examples of storage devices 1216. A storage device is any piece of hardware that is capable of storing information, such as, for example, without limitation, data, program code in functional form, and other suitable information either on a temporary basis or a permanent basis. Storage devices 1216 also may be referred to as computer readable storage devices in these examples. Memory 1206, in these examples, may be, for example, a random access memory or any other suitable volatile or non-volatile storage device. Persistent storage 1208 may take various forms, depending on the particular implementation.

For example, persistent storage 1208 may contain one or more components or devices. For example, persistent storage 1208 may be a hard drive, a flash memory, a rewritable optical disk, a rewritable magnetic tape, or some combination of the above. The media used by persistent storage 1208 also may be removable. For example, a removable hard drive may be used for persistent storage 1208.

Communications unit 1210, in these examples, provides for communications with other data processing systems or devices. In these examples, communications unit 1210 is a network interface card. Communications unit 1210 may provide communications through the use of either or both physical and wireless communications links.

Input/output (I/O) unit 1212 allows for input and output of data with other devices that may be connected to data processing system 1200. For example, input/output (I/O) unit 1212 may provide a connection for user input through a keyboard, a mouse, and/or some other suitable input device. Further, input/output (I/O) unit 1212 may send output to a printer. Display 1214 provides a mechanism to display information to a user.

Instructions for the operating system, applications, and/or programs may be located in storage devices 1216, which are in communication with processor unit 1204 through communications fabric 1202. In these illustrative examples, the instructions are in a functional form on persistent storage 1208. These instructions may be loaded into memory 1206 for execution by processor unit 1204. The processes of the different embodiments may be performed by processor unit 1204 using computer-implemented instructions, which may be located in a memory, such as memory 1206.

These instructions are referred to as program instructions, program code, computer usable program code, or computer readable program code that may be read and executed by a processor in processor unit 1204. The program code in the different embodiments may be embodied on different physical or computer readable storage media, such as memory 1206 or persistent storage 1208.

Program code 1218 is located in a functional form on computer readable media 1220 that is selectively removable and may be loaded onto or transferred to data processing system 1200 for execution by processor unit 1204. Program code 1218 and computer readable media 1220 form computer program product 1222 in these examples. In one example, computer readable media 1220 may be computer readable storage media 1224 or computer readable signal media 1226.

Computer readable storage media 1224 may include, for example, an optical or magnetic disk that is inserted or placed into a drive or other device that is part of persistent storage 1208 for transfer onto a storage device, such as a hard drive, that is part of persistent storage 1208. Computer readable storage media 1224 also may take the form of a persistent storage, such as a hard drive, a thumb drive, or a flash memory, that is connected to data processing system 1200. In some instances, computer readable storage media 1224 may not be removable from data processing system 1200.

In these examples, computer readable storage media 1224 is a physical or tangible storage device used to store program code 1218 rather than a medium that propagates or transmits program code 1218. Computer readable storage media 1224 is also referred to as a computer readable tangible storage device or a computer readable physical storage device. In other words, computer readable storage media 1224 is a media that can be touched by a person.

Alternatively, program code 1218 may be transferred to data processing system 1200 using computer readable signal media 1226. Computer readable signal media 1226 may be, for example, a propagated data signal containing program code 1218. For example, computer readable signal media 1226 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 1218 may be downloaded over a network to persistent storage 1208 from another device or data processing system through computer readable signal media 1226 for use within data processing system 1200. For instance, program code stored in a computer readable storage medium in a server data processing system may be downloaded over a network from the server to data processing system 1200. The data processing system providing program code 1218 may be a server computer, a client computer, or some other device capable of storing and transmitting program code 1218.

The different components illustrated for data processing system 1200 are not meant to provide architectural limitations to the manner in which different embodiments may be implemented. The different illustrative embodiments may be implemented in a data processing system including components in addition to and/or in place of those illustrated for data processing system 1200. Other components shown in FIG. 12 can be varied from the illustrative examples shown. The different embodiments may be implemented using any hardware device or system capable of running program code. As one example, data processing system 1200 may include organic components integrated with inorganic components and/or may be comprised entirely of organic components excluding a human being. For example, a storage device may be comprised of an organic semiconductor.

In another illustrative example, processor unit 1204 may take the form of a hardware unit that has circuits that are manufactured or configured for a particular use. This type of hardware may perform operations without needing program code to be loaded into a memory from a storage device to be configured to perform the operations.

For example, when processor unit 1204 takes the form of a hardware unit, processor unit 1204 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 1218 may be omitted, because the processes for the different embodiments are implemented in a hardware unit.

In still another illustrative example, processor unit 1204 may be implemented using a combination of processors found in computers and hardware units. Processor unit 1204 may have a number of hardware units and a number of processors that are configured to run program code 1218. With this depicted example, some of the processes may be implemented in the number of hardware units, while other processes may be implemented in the number of processors.

In another example, a bus system may be used to implement communications fabric 1202 and may be comprised of one or more buses, such as a system bus or an input/output bus. Of course, the bus system may be implemented using any suitable type of architecture that provides for a transfer of data between different components or devices attached to the bus system.

Additionally, communications unit 1210 may include a number of devices that transmit data, receive data, or both transmit and receive data. Communications unit 1210 may be, for example, a modem or a network adapter, two network adapters, or some combination thereof. Further, a memory may be, for example, memory 1206, or a cache, such as that found in an interface and memory controller hub that may be present in communications fabric 1202.

The flowcharts and block diagrams described herein illustrate the architecture, functionality, and operation of possible implementations of systems, methods, and computer program products according to various illustrative embodiments. In this regard, each block in the flowcharts or block diagrams may represent a module, segment, or portion of code, which comprises one or more executable instructions for implementing the specified logical function or functions. It should also be noted that, in some alternative implementations, the functions noted in a block may occur out of the order noted in the figures. For example, the functions of two blocks shown in succession may be executed substantially concurrently, or the functions of the blocks may sometimes be executed in the reverse order, depending upon the functionality involved.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of controlling movement of a component in a system by a plurality of actuators, comprising:
   receiving an operation actuation command to move the component; and
   for each of the plurality of actuators:
      using the operation actuation command to generate a feed-forward equalization command for the actuator,
      combining the feed-forward equalization command for the actuator with the operation actuation command to provide an equalized actuation command for the actuator, and
      controlling the actuator to move the component using the equalized actuation command for the actuator.

2. The method of claim 1 further comprising, for each of the plurality of actuators:
   receiving feedback signals from the plurality of actuators;
   using the feedback signals to generate a feedback equalization command for the actuator; and
   combining the feedback equalization command for the actuator with the feed-forward equalization command for the actuator and the operation actuation command to provide the equalized actuation command for the actuator.

3. The method of claim 1, wherein using the operation actuation command to generate the feed-forward equalization command for the actuator comprises using the operation actuation command to generate the feed-forward equalization command for the actuator using a mapping table for the actuator that comprises a mapping of feed-forward equalization commands for the actuator to actuation commands.

4. The method of claim 3, wherein using the operation actuation command to generate the feed-forward equalization command for the actuator using the mapping table for the actuator comprises:

determining whether the operation actuation command corresponds to an actuation command in the mapping table for the actuator;
in response to a determination that the operation actuation command corresponds to an actuation command in the mapping table for the actuator, using a feed-forward equalization command for the actuator that is mapped to the actuation command in the mapping table for the actuator that corresponds to the operation actuation command as the feed-forward equalization command for the actuator; and
in response to a determination that the operation actuation command does not correspond to an actuation command in the mapping table for the actuator, generating the feed-forward equalization command for the actuator by interpolation from a feed-forward equalization command for the actuator that is mapped to an actuation command in the mapping table for the actuator.

5. The method of claim 3 further comprising calibrating the mapping table for each of the plurality of actuators by, for each of a plurality of calibration actuation commands:
   controlling the plurality of actuators to move the component using the calibration actuation command; and
   for each of the plurality of actuators:
   receiving feedback signals from the plurality of actuators,
   using the feedback signals to generate the feed-forward equalization command for the actuator for the calibration actuation command, and
   mapping the feed-forward equalization command for the actuator to the actuation command corresponding to the calibration actuation command in the mapping table.

6. The method of claim 1 further comprising delaying combining the feed-forward equalization command for the actuator with the operation actuation command to provide the equalized actuation command for the actuator based on a model of actuator system response delay.

7. The method of claim 1, wherein the system is an aircraft and the component is a flight control surface for the aircraft.

8. A method of controlling movement of a component in a system by a plurality of actuators, comprising:
   in a calibration mode, calibrating a mapping table for each of the plurality of actuators by, for each of a plurality of calibration actuation commands:
      controlling the plurality of actuators to move the component using the calibration actuation command, and
      for each of the plurality of actuators:
         receiving feedback signals from the plurality of actuators,
         using the feedback signals to generate a feed-forward equalization command for the actuator for the calibration actuation command, and
         mapping the feed-forward equalization command for the actuator to an actuation command corresponding to the calibration actuation command in the mapping table; and
   in an operation mode, controlling each of the plurality of actuators to move the component using the feed-forward equalization command for the actuator generated from the mapping table for the actuator.

9. The method of claim 8, wherein, in the operation mode, controlling each of the plurality of actuators to move the component comprises:
   receiving an operation actuation command to move the component; and for each of the plurality of actuators:
  using the operation actuation command to generate the feed-forward equalization command for the actuator using the mapping table for the actuator,
  combining the feed-forward equalization command for the actuator with the operation actuation command to provide an equalized actuation command for the actuator, and
  controlling the actuator to move the component using the equalized actuation command for the actuator.

10. The method of claim 9, wherein using the operation actuation command to generate the feed-forward equalization command for the actuator using the mapping table for the actuator comprises:
  determining whether the operation actuation command corresponds to an actuation command in the mapping table for the actuator;
  in response to a determination that the operation actuation command corresponds to an actuation command in the mapping table for the actuator, using a feed-forward equalization command for the actuator that is mapped to the actuation command in the mapping table for the actuator that corresponds to the operation actuation command as the feed-forward equalization command for the actuator; and
  in response to a determination that the operation actuation command does not correspond to an actuation command in the mapping table for the actuator, generating the feed-forward equalization command for the actuator by interpolation from a feed-forward equalization command for the actuator that is mapped to an actuation command in the mapping table for the actuator.

11. The method of claim 9, wherein, in the operation mode, controlling each of the plurality of actuators to move the component further comprises:
  receiving the feedback signals from the plurality of actuators;
  using the feedback signals to generate a feedback equalization command for the actuator; and
  combining the feedback equalization command for the actuator with the feed-forward equalization command for the actuator and the operation actuation command to provide the equalized actuation command for the actuator.

12. The method of claim 9 further comprising delaying combining the feed-forward equalization command for the actuator with the operation actuation command to provide the equalized actuation command for the actuator based on a model of actuator system response delay.

13. The method of claim 8, wherein the system is an aircraft and the component is a flight control surface for the aircraft.

14. An apparatus for controlling movement of a component in a system by a plurality of actuators, comprising:
  a system controller configured to generate an operation actuation command to move the component;
  a plurality of equalization controllers, comprising an equalization controller for each of the plurality of actuators, wherein the equalization controller for each of the plurality of actuators is configured to use the operation actuation command to generate a feed-forward equalization command for the actuator and to combine the feed-forward equalization command for the actuator with the operation actuation command to provide an equalized actuation command for the actuator; and
  a plurality of actuator controllers, comprising an actuator controller for each of the plurality of actuators, wherein the actuator controller for each of the plurality of actuators is configured to control the actuator to move the component using the equalized actuation command for the actuator.

15. The apparatus of claim 14, wherein the equalization controller for each of the plurality of actuators is further configured to:
  receive feedback signals from the plurality of actuators;
  use the feedback signals to generate a feedback equalization command for the actuator; and
  combine the feedback equalization command for the actuator with the feed-forward equalization command for the actuator and the operation actuation command to provide the equalized actuation command for the actuator.

16. The apparatus of claim 14, wherein the equalization controller for each of the plurality of actuators is configured to use the operation actuation command to generate the feed-forward equalization command for the actuator using a mapping table for the actuator that comprises a mapping of feed-forward equalization commands for the actuator to actuation commands.

17. The apparatus of claim 16, wherein the equalization controller for each of the plurality of actuators is configured to:
  determine whether the operation actuation command corresponds to an actuation command in the mapping table for the actuator;
  in response to a determination that the operation actuation command corresponds to an actuation command in the mapping table for the actuator, using a feed-forward equalization command for the actuator that is mapped to the actuation command in the mapping table for the actuator that corresponds to the operation actuation command as the feed-forward equalization command for the actuator; and
  in response to a determination that the operation actuation command does not correspond to an actuation command in the mapping table for the actuator, generating the feed-forward equalization command for the actuator by interpolation from a feed-forward equalization command for the actuator that is mapped to an actuation command in the mapping table for the actuator.

18. The apparatus of claim 16, wherein the system controller is configured to calibrate the mapping table for each of the plurality of actuators by:
  generating a plurality of calibration actuation commands; and
  for each of the plurality of calibration actuation commands:
    providing the calibration actuation command to the plurality of actuator controllers to control the plurality of actuators to move the component using the calibration actuation command, and
    for each of the plurality of actuators:
    receiving feedback signals from the plurality of actuators,
    using the feedback signals to generate the feed-forward equalization command for the actuator for the calibration actuation command, and
    mapping the feed-forward equalization command for the actuator to the actuation command corresponding to the calibration actuation command in the mapping table.

19. The apparatus of claim 14, wherein the equalization controller for each of the plurality of actuators is configured to delay combining the feed-forward equalization command for the actuator with the operation actuation command to provide the equalized actuation command for the actuator based on a model of actuator system response delay.

20. The apparatus of claim 14, wherein the system is an aircraft and the component is a flight control surface for the aircraft.

\* \* \* \* \*